United States Patent [19]
Gebert et al.

[11] Patent Number: 5,809,488
[45] Date of Patent: Sep. 15, 1998

[54] MANAGEMENT SYSTEM FOR A POWER STATION INSTALLATION

[75] Inventors: Rudolf Gebert, Wendelstein; Michael Grühn, Erlangen; Walter Zörner, Baiersdorf; Claus Hillermeier; Markus Höhfeld, both of München, all of Germany

[73] Assignee: Siemens Aktiengesellschaft, Munich, Germany

[21] Appl. No.: 780,493

[22] Filed: Jan. 8, 1997

Related U.S. Application Data

[63] Continuation of PCT/DE95/00875, Jul. 7, 1995.

[30] Foreign Application Priority Data

Jul. 8, 1994 [DE] Germany .................. 44 23 897.5

[51] Int. Cl.$^6$ ...................................... G06F 15/18
[52] U.S. Cl. ................... 706/10; 706/13; 706/21; 706/6 D; 706/16
[58] Field of Search ................... 395/11, 22, 13

[56] References Cited

U.S. PATENT DOCUMENTS 5,524,175  6/1996  Sato et al. .................. 395/11

FOREIGN PATENT DOCUMENTS

4200260A1  7/1993  Germany .

OTHER PUBLICATIONS

Japanese Patent Abstract No. 5143757 (Toru), dated Jun. 11, 1993.

*Primary Examiner*—George B. Davis
*Attorney, Agent, or Firm*—Herbert L Lerner; Laurence A. Greenberg

[57] ABSTRACT

In the control of a power station installation having a number of power station blocks, in which each power station block is controlled by using at least one reference variable, it is intended to permit reliable determination of especially favorable reference variables while also taking the current installation condition into account. To this end, a management system for the power station installation includes a computer unit which determines reference variables for the power station block or for each of the power station blocks through the use of a genetic algorithm, and an optimization module which is connected to the computer unit. The optimization module is connected to a number of neural networks and one neural network is assigned to each power station block.

5 Claims, 1 Drawing Sheet

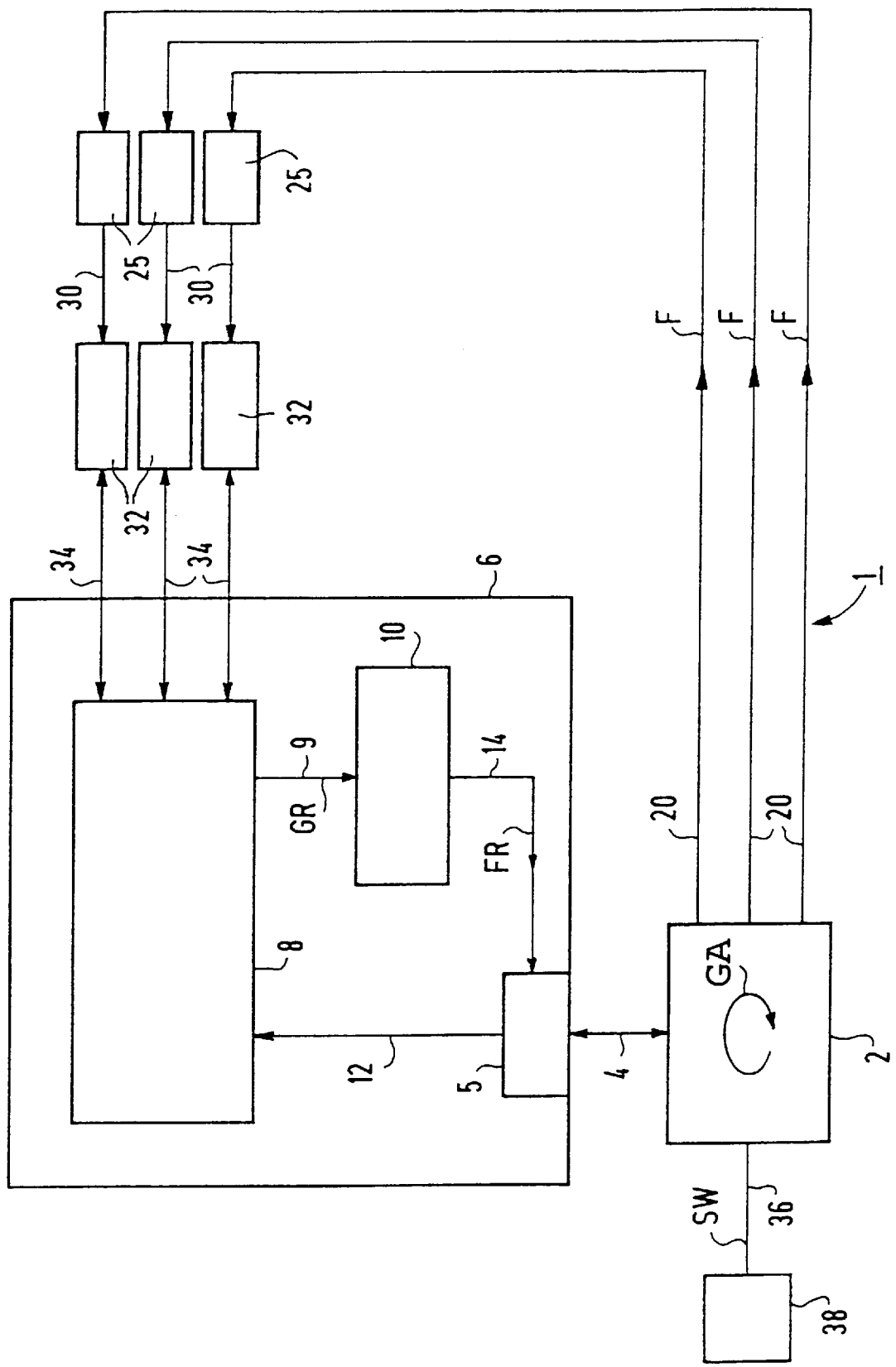

MANAGEMENT SYSTEM FOR A POWER STATION INSTALLATION

CROSS-REFERENCE TO RELATED APPLICATION

This application is a Continuation of International Application Ser. No. PCT/DE95/00875, filed Jul. 7, 1995.

BACKGROUND OF THE INVENTION

FIELD OF THE INVENTION

The invention relates to a management system for a power station installation having a number of power station blocks.

When operating a power station installation having a number of power station blocks, each component is normally controlled by using reference variables. In that case, the reference variables are based on operating parameters which are relevant to the installation and are as a rule dependent on a number of constraints. For example, a power station installation having a number of power station blocks is controlled by a load set point being fed as a reference variable to each power station block. It is then usually necessary to satisfy the constraint that the sum of all of the load set points fed to the power station blocks be equal to a total load set point, within a tolerance band. That total load set point is predefined by consumers as a grid requirement.

In order to provide particularly economical or particularly effective operation of a power station installation, it may be necessary to optimize the reference variables selected for the control of the components with respect to a number of criteria. For instance, in order to be able to operate a power station installation having two or more power station blocks, which can be identical or different in terms of type or action, in such a way as to be particularly economical and have a particularly high efficiency, the total power to be output by the power station installation to the consumers must be split up amongst the power station blocks, within the framework of a load distribution, in such a way that the required fuel consumption as a whole is particularly low, and/or that the heating or process steam can be coupled out particularly effectively. To that end, a nominal load is determined for each power station block as the reference variable. Each power station block is controlled by using the nominal load which is determined for it.

Reference variables of that type for the control of power station blocks are usually determined empirically by the power station operating personnel and are thus very much dependent on the experience of the operating personnel. Due to high computing complexity, previously existing automated systems for determining the reference variables are normally based on a linearization of the functional relationship between the electrical power output by the power station block, the district heating power output, the process steam mass flow and the thermal power to be fed to the power station block, which as a rule is proportional to the fuel consumption. However, because of that linearization of the functional relationship, the calculation methods executed in such systems are inaccurate. In addition, as a rule it is not possible to take into account a current installation state, such as, for example, the failure of a heat exchanger, during the determination of the reference variables.

SUMMARY OF THE INVENTION

It is accordingly an object of the invention to provide a management system for a power station installation having a number of power station blocks, which overcomes the hereinafore-mentioned disadvantages of the heretofore-known devices of this general type and which reliably determines particularly favorable reference variables for each power station block.

With the foregoing and other objects in view there is provided, in accordance with the invention, a management system for a power station installation having a number of power station blocks, comprising a computer unit determining reference variables for the power station block or for each of the power station blocks through the use of a genetic algorithm; an optimization module connected to the computer unit; and a number of neural networks each connected to the optimization module and each assigned to a respective power station block or component.

Genetic algorithms are comprehensively described in the publication by J. Heistermann, entitled "Genetische Algorithmen" [Genetic Algorithms], published by Teubner Verlag, Stuttgart, Germany 1994.

In accordance with another feature of the invention, the computer unit determines, as the reference variable for each power station block for a predefinable time interval, a set point for its proportion of the power for an overall nominal load to be covered.

In accordance with a further feature of the invention, in order to determine the reference variables for each power station block particularly precisely and with low computing effort, the optimization module includes a fine optimization stage in addition to a coarse optimization stage connected to the neural networks.

In accordance with an added feature of the invention, the fine optimization stage is constructed to carry out an analytical process simulation. With regard to the efficiency, the process simulation in this case can also take into account nonlinear correlations between the power output by the power station units and the thermal power to be supplied.

In accordance with a concomitant feature of the invention, in order to employ the genetic algorithm particularly effectively in the determination of the reference variables, a separate neural network is expediently provided for the generation of starting values for the genetic algorithm. This neural network determines input variables for the genetic algorithm while taking into account knowledge relevant to the installation. Thus, results from previous determinations of reference variables under comparable installation conditions or even in the case of installation conditions which differ from the current installation condition, may be used for the determination of the current reference variables. As a result, the expenditure on computing time for the determination of the reference variables is kept particularly low, so that a management system of this type for a power station installation is particularly flexible.

The advantages achieved with the invention are in particular that a high accuracy can be achieved by using a genetic algorithm for the determination of reference variables for the components of a power station installation. In particular, as a result of the combination of the genetic algorithm with a process simulation, the reference variables can be determined very precisely, reliably and also rapidly, that is to say with little computing effort. In this configuration, the division of the optimization module into a coarse and a fine optimization stage is particularly expedient.

Other features which are considered as characteristic for the invention are set forth in the appended claims.

Although the invention is illustrated and described herein as embodied in a management system for a power station installation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a block circuit diagram of an exemplary embodiment of a management system for a power station installation, according to the invention.

DESCRIPTION OF THE PREFERRED EMBODIMENTS

Referring now in detail to the single FIGURE of the drawing, there is seen a management system 1 that includes a computer unit 2 which is connected through a data line 4 to an interface 5 of an optimization module 6. The optimization module 6 includes a coarse optimization stage 8 and a fine optimization stage 10 which are interconnected through a line 9 and which are connected to the interface 5 through respective data lines 12, 14.

The computer unit 2 is further connected through data lines 20 to power station blocks 25 of a power station installation which is not shown in further detail. Three of the power station blocks 25 are shown in the figure. Each power station block 25 is connected through a data line 30 to a neural network 32 which is assigned to it and which in turn is connected through a data line 34 to the coarse optimization stage 8 of the optimization module 6. In addition, the computer unit or module 2 is connected through a data line 36 to a separate neural network 38.

When the power station installation is being operated, the power station blocks 25 are controlled by feeding a load set point or a nominal load value to each power station block 25 as a reference variable F, by the management system 1 over the data lines 20. As an alternative, however, reference variables F determined by the management system 1 can also be communicated to operating personnel of the power station installation, and then forwarded manually to the power station blocks 25 as manipulated variables. The load set points in this case are subject to the constraint that their sum is intended to be equal to a total load required by a consumer. The load set point or the nominal load of a power station block may be electrical power, heating power and/or process steam. In order to provide economical operation of the power station installation, it is intended that the power station blocks 25 be controlled in such a way that their total fuel consumption is as low as possible.

The reference variable F to be fed to each power station block 25 is determined by the management system 1 as the result of an optimization through the use of a genetic algorithm. In this configuration, an operational plan describing the switching state "ON" or "OFF" of each power station block 25 as a function of a time interval is interpreted as an entity. A planning interval, for example one day, is subdivided into a number of time intervals, for example hours, in which the nominal load of each power station unit 25 is constant in each case. The operational plan is analyzed in the computer unit 2 in the form of a matrix, the rows of which are in each case assigned to a power station block 25 and the columns of which are in each case assigned to a time interval.

The matrix of ON/OFF switching states for the individual power station blocks 25 serves as the genetic code of the operational plan entity. For each time interval of the operational plan entity, the computer unit 2 communicates the switching state "ON" or "OFF" of each power station block 25 to the optimization module 6 through the interface 5.

The optimization module 6 then determines a splitting up of a predefined nominal load to the power station blocks 25 in the switching state "ON" which requires the lowest total thermal power to be fed. To this end, a coarse optimization is initially carried out in the coarse optimization stage 8 on the basis of an optimization algorithm which is known per se. In the process, each neural network 32 which is connected to the coarse optimization stage 8 simulates the behavior of the power station block 25 assigned to it. The neural architecture is based on a multilayer back propagation perceptron. Furthermore, it is possible to feed measured variables M to each neural network 32 through the data lines 30. The measured variables M characterize the current condition of the power station block 25 assigned to that neural network 32. Furthermore, the results of earlier simulations can also be taken into account through the use of these neural networks 32.

Results GR of this coarse optimization are transferred through the data line 9 to the fine optimization stage 10. In the fine optimization stage 10, these results GR are finely optimized through the use of an analytical process simulation, in which nonlinear correlations between relevant process parameters, such as, for example, electrical power, district heating power, process steam mass flow and thermal power to be supplied, are also particularly taken into account. Results FR which are thus obtained in the manner of an instantaneous optimization, are fed to the interface 5 and transferred from there to the computer unit 2.

In the computer unit 2, using the results FR for each time interval of an operational plan entity, the fitness of this operational plan entity is evaluated, with correlations between adjacent time intervals also being taken into account in particular. To this end, for example, the thermal power to be fed to each power station block 25 over each time interval can be summed. Furthermore, thermal power to be provided, for example for starting up or shutting down a power station block or for efficiency losses because of other boundary conditions, is additionally taken into account separately. During an initialization of a population of operational plans and during a selection of entities for a recombination, as well as during replacement of an old generation of entities with a new, standard methods of a genetic algorithm are employed. A sequence of iteration steps of the genetic algorithm is indicated by an arrow GA. Constraints, such as, for example, the total electrical power to be output by the power station installation, that is to say the sum of the electrical power to be output by the power station blocks 25, are likewise taken into account in the process.

The results of the determination of the reference variables F for the power station blocks 25 for predefinable total powers of the power station installation are additionally transferred through the data line 36 to the neural network 38 and stored there. In the event of a new determination of reference variables F for the power station blocks 25, this information is used for the generation of especially favorable starting values SW, which are transferred through the data line 36 to the computer unit 2 for the initialization of the genetic algorithm. In this way, it is possible to make use of results obtained earlier, so that computing time is saved.

In addition, in the management system 1 the reference variables F for each power station block 25 may also be determined with a particularly low computing effort while taking into account a multiplicity of boundary conditions. It is only in this way that the determination of the reference variables F is made possible in such a short time that a current installation condition can be taken into account.

We claim:

1. A management system for a power station installation having a number of power station blocks, comprising:

a computer unit determining reference variables for at least one power station block by using a genetic algorithm;

an optimization module connected to said computer unit; and a number of neural networks each connected to said optimization module and each assigned to a respective power station block.

2. The management system according to claim 1, wherein said computer unit determines a set point for a proportion of power for an overall nominal load to be covered, as the reference variable for each power station block for a predefinable time interval.

3. The management system according to claim 1, wherein said optimization module includes a coarse optimization stage connected to said neural networks and a fine optimization stage connected to said coarse optimization stage.

4. The management system according to claim 3, wherein said fine optimization stage carries out an analytical process simulation.

5. The management system according to claim 1, including another neural network connected to said computer unit for generating starting values for the genetic algorithm.

* * * * *